United States Patent
Tannenbaum et al.

(10) Patent No.: US 11,416,960 B2
(45) Date of Patent: Aug. 16, 2022

(54) SHADER ACCESSIBLE CONFIGURABLE BINNING SUBSYSTEM

(71) Applicant: Samsung Electronics Co., Ltd., Suwon-si (KR)

(72) Inventors: David C. Tannenbaum, Austin, TX (US); Keshavan Varadarajan, Austin, TX (US); Veynu Narasiman, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/110,284

(22) Filed: Dec. 2, 2020

(65) Prior Publication Data
US 2022/0148122 A1   May 12, 2022

Related U.S. Application Data

(60) Provisional application No. 63/110,974, filed on Nov. 6, 2020.

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC .............. G06T 1/20; G06T 1/60; G06T 15/80
USPC ....................................... 345/501, 426, 506
See application file for complete search history.

(56) References Cited

U.S. PATENT DOCUMENTS

| | | | |
|---|---|---|---|
| 2010/0141666 A1 | 6/2010 | Christopher et al. | |
| 2013/0135341 A1 | 5/2013 | Seetharamaiah et al. | |
| 2014/0281332 A1* | 9/2014 | Koob | G06F 12/1036 711/170 |
| 2015/0332429 A1 | 11/2015 | Fernandez et al. | |
| 2015/0332495 A1* | 11/2015 | Liao | G06T 11/40 345/501 |
| 2015/0363969 A1 | 12/2015 | Yang | |
| 2016/0063663 A1* | 3/2016 | Kuo | G06T 15/005 345/501 |
| 2017/0161944 A1 | 6/2017 | Deshwal et al. | |
| 2018/0025463 A1* | 1/2018 | Kazakov | G06T 1/20 345/522 |
| 2020/0020067 A1 | 1/2020 | Liang et al. | |

* cited by examiner

*Primary Examiner* — Jacinta M Crawford
(74) *Attorney, Agent, or Firm* — Renaissance IP Law Group LLP

(57) ABSTRACT

A binning subsystem of a GPU includes a storage subsystem, a shader core to output first data via a first path, a selector to receive the first data via the first path, and to receive second data from the storage subsystem via a second path. The storage subsystem includes a binner unit and a control logic unit. The control logic unit causes the selector to transfer the first data or the second data to the binner unit. The binner unit may transfer binner output data to the shader core via a third path. The binner unit may transfer the binner output data to one or more subsequent stages of a graphics pipeline via a fourth path. The binner unit may transfer the binner output data to the storage subsystem via a fifth path. The control logic unit may control the binner unit such that the binner unit can be used for general purpose computation.

14 Claims, 9 Drawing Sheets

SHADER ACCESSIBLE CONFIGURABLE BINNING SUBSYSTEM

RELATED APPLICATION DATA

This application claims the benefit of U.S. Provisional Application Ser. No. 63/110,974, filed on Nov. 6, 2020, which is hereby incorporated by reference.

TECHNICAL AREA

The present disclosure relates to graphics processing, and more particularly, to a shader accessible configurable binning subsystem of a graphics processing unit (GPU).

BACKGROUND

Some GPUs may be primarily based on one of two general architectures: immediate mode rendering (IMR), or tile based deferred rendering (TBDR). A hybrid of these architectures may also be used. TBDR may be characterized by sorting the stream of incoming primitives (e.g., triangles defined by a triplet of (x,y) coordinate pairs) into bins or tiles in accordance with their (x,y) screen-space positions. Once sorted, processing may continue by querying each tile for the list of primitives found with coverage in the tile's screens-space expanse. IMR-based GPUs may also have some form of binning, used to improve the general cache locality of the memory accesses needed for their depth and color buffers.

A dedicated hardware binner unit may be used in the operation of binning. The binner unit may receive a stream of primitives, and proceed to sort the primitives into a collection of bins based on the primitives' screen-space positions. While this may be an efficient operation in terms of reducing later memory traffic, by improving cache locality through restricting work to spatially proximal pixels, it may be an idle piece of fixed-function hardware during non-graphics, i.e., compute, operations.

More generally, a modern GPU may include a programmable, highly parallel set of compute engines and a collection of various fixed-function units, some of which may include: texture address generation and filtering; primitive clipping, culling, viewport transforming; binning; rasterization setup and rasterization; depth comparisons; blending; and other operations. GPUs may be used for both graphics intensive operations and compute intensive workloads. However, during the latter, the majority of the fixed-function hardware may sit idle, merely dissipating leakage power.

BRIEF SUMMARY

Various embodiments of the disclosure include a binning subsystem of a GPU, which may include a storage subsystem, a shader core configured to output first data via a first path, a selector configured to receive the first data via the first path, and second data from the storage subsystem via a second path, a binner unit; and a control logic unit configured to control the selector, and to cause the selector to transfer at least one of the first data or the second data to the binner unit. The binning subsystem may include a return path from the binner unit to the shader core. The binner unit may be configured to transfer binner output data to the shader core via the return path.

Some embodiments disclosed herein include a binning method of a GPU, which may include outputting, by a shader core, first data via a first path. The method may include receiving, by a selector, the first data via the first path. The method may include receiving, by the selector, second data from a storage subsystem via a second path. The method may include controlling, by a control logic unit, the selector. The method may include causing, by the control logic unit, the selector to transfer at least one of the first data or the second data to a binner unit. The method may include transferring binner output data to the shader core via the return path.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first device could be termed a second device, and, similarly, a second device could be termed a first device, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some embodiments disclosed herein may allow repurposing of the binning hardware for use during compute algorithms, and making the binning hardware available to the general-purpose, programmable portion of the GPU so it can participate in various compute algorithms rather than simply remaining idle. Accordingly, leakage and silicon area costs may be amortized, and performance may be improved.

Figure 1A:
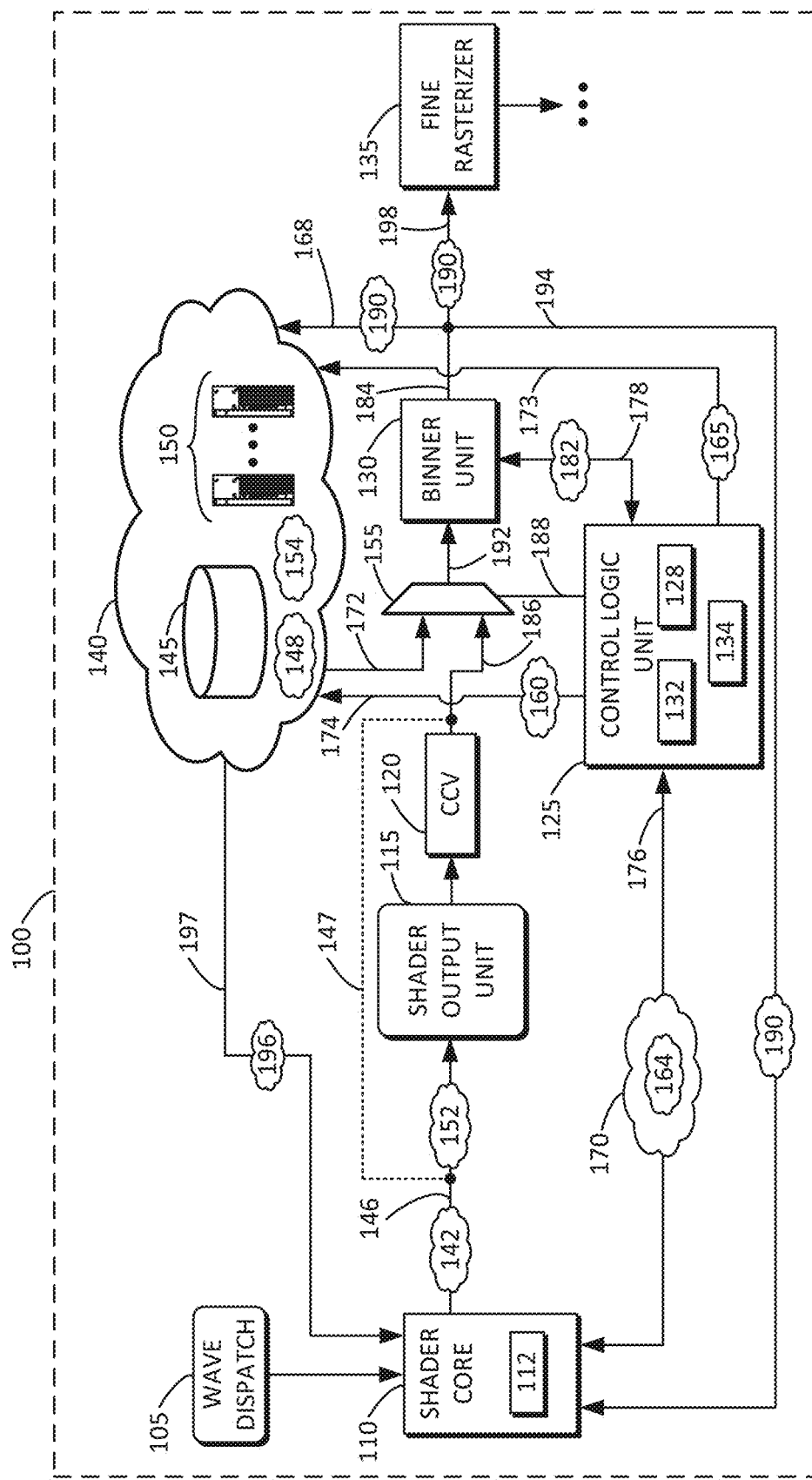
FIG. 1A illustrates a block diagram of a shader accessible configurable binning subsystem in accordance with some embodiments.
Figure 1B:
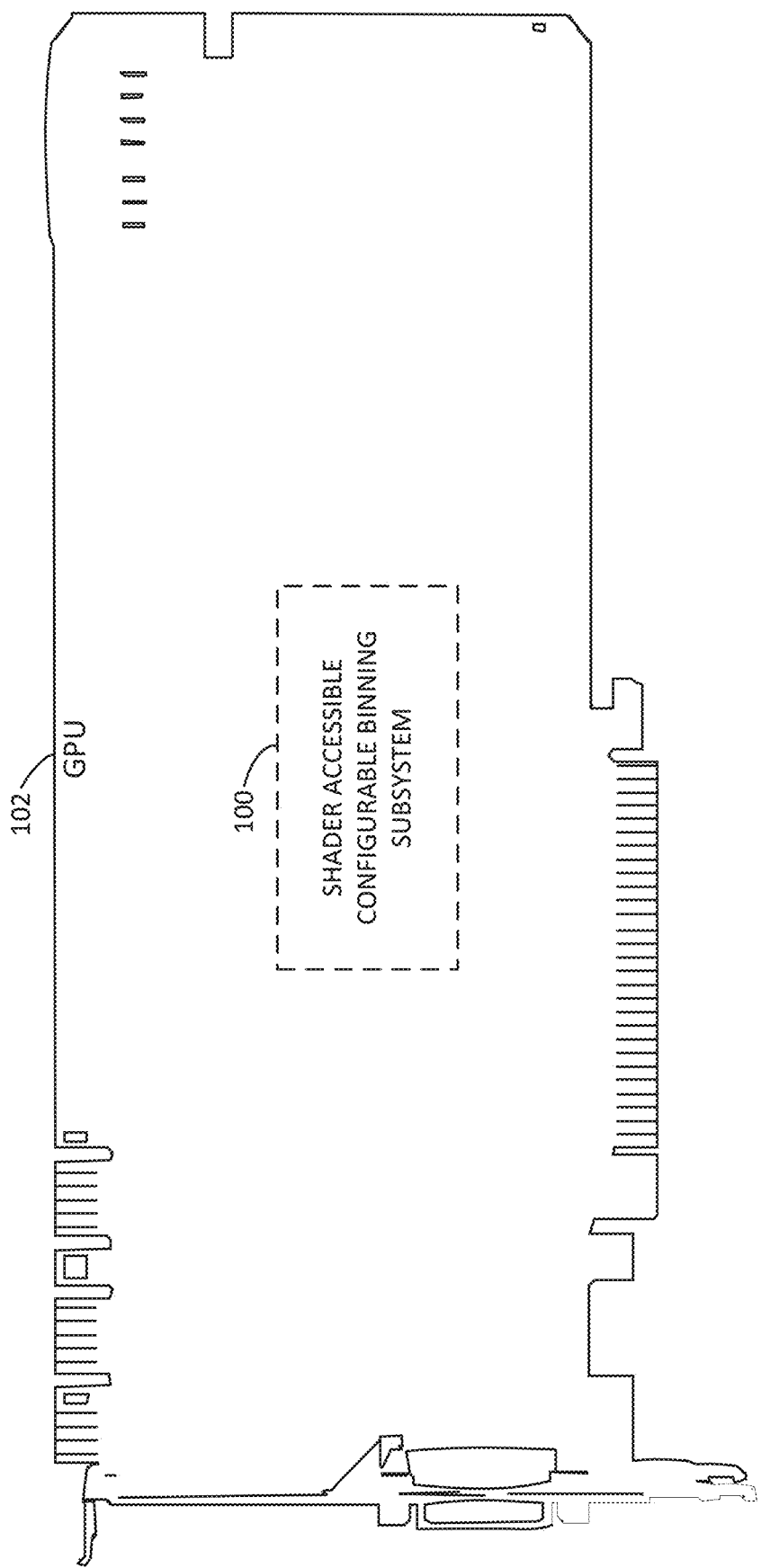
FIG. 1B illustrates a GPU including the shader accessible configurable binning subsystem of FIG. 1A in accordance with some embodiments.
Figure 1C:
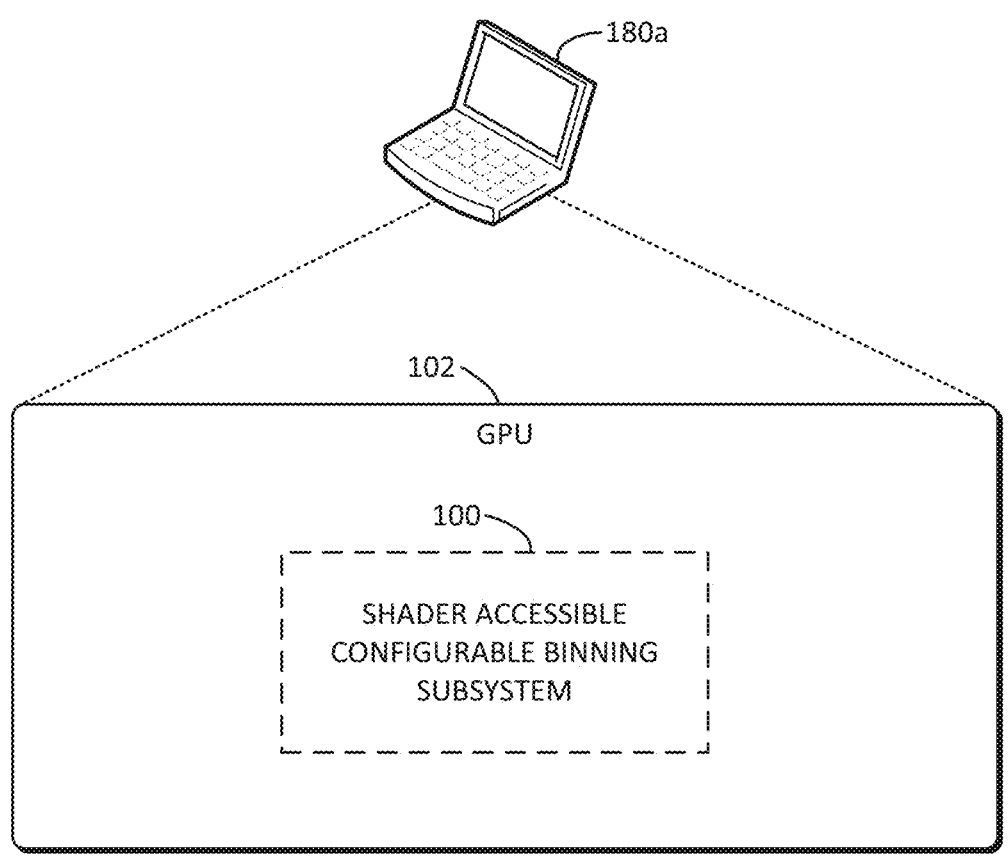
FIG. 1C illustrates a mobile personal computer including a GPU having the shader accessible configurable binning subsystem of FIG. 1A in accordance with some embodiments.
Figure 1D:
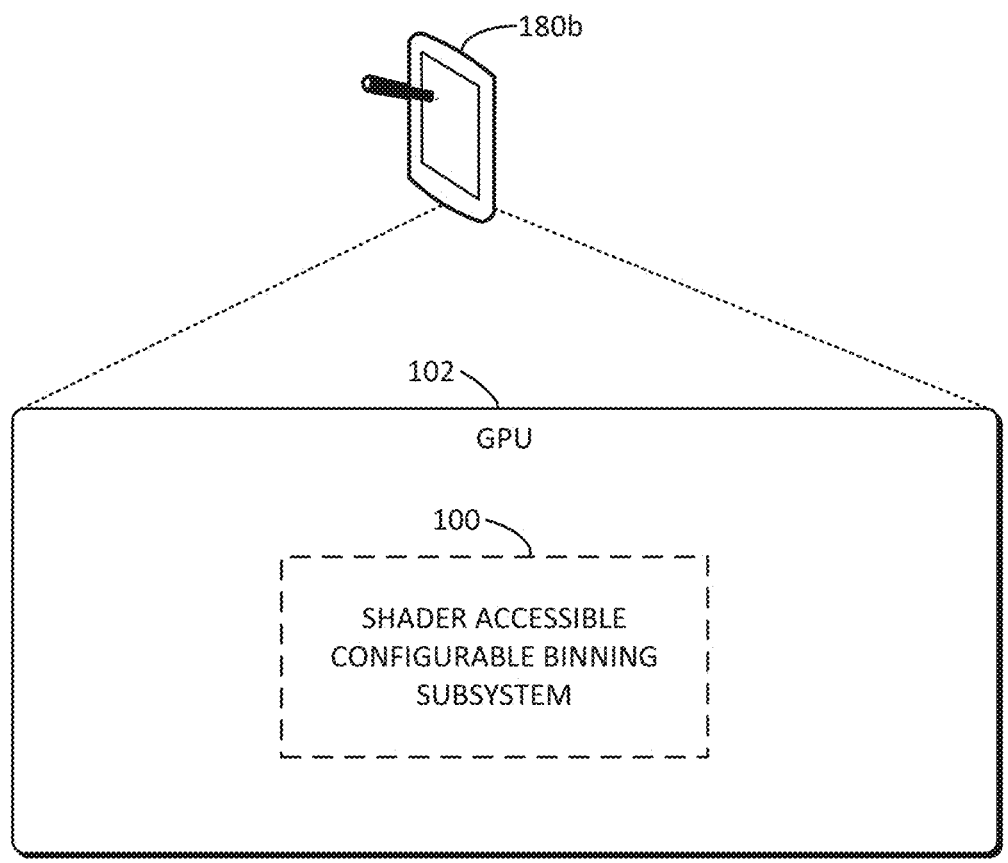
FIG. 1D illustrates a tablet computer including a GPU having the shader accessible configurable binning subsystem of FIG. 1A in accordance with some embodiments.
Figure 1E:
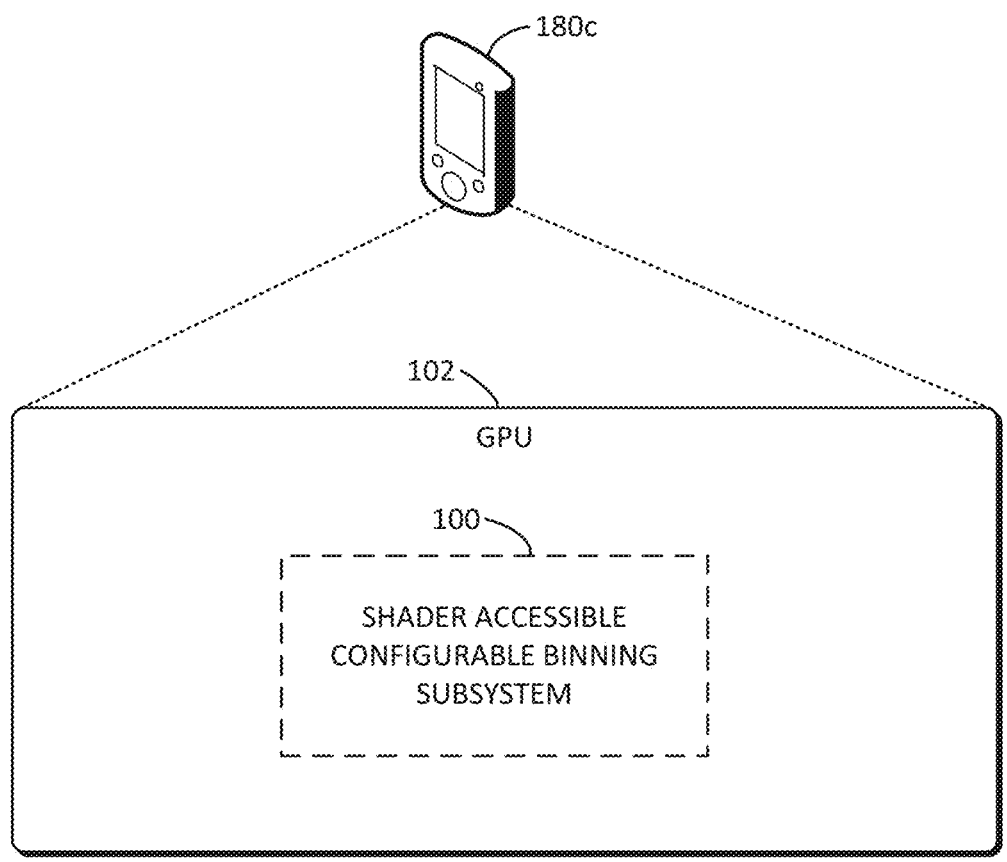
FIG. 1E illustrates a smart phone including a GPU having the shader accessible configurable binning subsystem of FIG. 1A in accordance with some embodiments.

FIG. 1A illustrates a block diagram of a shader accessible configurable binning subsystem 100 in accordance with some embodiments. FIG. 1B illustrates a GPU 102 including the shader accessible configurable binning subsystem 100 of FIG. 1A in accordance with some embodiments. FIG. 1C illustrates a mobile personal computer 180a including a GPU 102 having the shader accessible configurable binning subsystem 100 of FIG. 1A in accordance with some embodiments. FIG. 1D illustrates a tablet computer 180b including a GPU 102 having the shader accessible configurable binning subsystem 100 of FIG. 1A in accordance with some embodiments. FIG. 1E illustrates a smart phone 180c including a GPU 102 having the shader accessible configurable binning subsystem 100 of FIG. 1A in accordance with some embodiments. Reference is now made to FIGS. 1A through 1E.

The shader accessible configurable binning subsystem 100 may include a wave dispatch 105, a shading core 110, a shader output unit 115, a clipping, culling, and viewport (CCV) unit 120, a binner unit 130, a fine rasterizer 135, a storage subsystem 140, a selector 155, and/or a control logic unit 125. The selector 155 can be a multiplexor, for example. The storage subsystem 140 may include volatile storage such as system memory 150, and/or non-volatile storage such as a solid-state drive (SSD) or other physical storage media 145. It will be understood that other components may be included in the shader accessible configurable binning subsystem 100.

The binner unit 130 may be accessed from the shader core 110. Conventionally, the binner unit 130 may have fixed-function operation, and dedicated solely to serving a primitive stream provided. In some embodiments disclosed herein, the binner unit 130 may be connected to the programmable shader core 110 and to the storage subsystem 140 so that the binner unit 130 can be used as a co-processor of the shader core 110, and thus can receive as input any data from the shader core 110. Such data need not be restricted to (x,y) screen-space coordinate pairs.

Some embodiments disclosed herein may repurpose the binning hardware for use in compute workloads and/or applications. For example, the binner unit 130 can be used for radix sort and/or merge sort compute algorithms, as further described below. Geometry work may be provided to the shader core 110 by a wave dispatch block 105, and the result of the shader processing may be collected in the shader output unit 115. The result may be transferred from the shader output unit 115 to the CCV unit 120 for transformation. The binner unit 130 may operate on primitives post-viewport transformation (i.e., in screen-space). In some embodiments disclosed herein, the binner unit 130 may also read from a separate data stream arriving from either the storage sub-system 140 or from another local data store. The control logic unit 125 may provide a read address 160 for read accesses from the storage sub-system 140 via link 174. The control logic unit 125 may provide a write address 165 for write accesses to the storage sub-system 140 via link 173.

One or more input data streams to the binner unit 130 can arrive from one or more sources, including the storage sub-system 140. In some embodiments, the binner unit 130 may benefit from a cache hierarchy. Additionally, the input to the binner unit 130 may arrive from local storage such as the shader core's 110 register file 112 or other shared or private local storage. Address generation logic 128 in the control logic unit 125 may behave in a direct memory access (DMA)-engine fashion to directly generate address sequences (e.g., 160, 165) for the input and output streams to and/or from the binner unit 130, or in combination with access to the shader core 110. While the shader core 110 may have main control, the control logic unit 125 can provide a more granular level of control over the binner unit 130 and the selector 155. The binner unit 130 may therefore be used when it would otherwise be idle. The control logic unit 125 may include sequencing and arbitration logic 134 to control use of the binner unit 130 in coordination with the shader core 110.

The control logic unit 125 may be responsive to the shader core 110, and more specifically to one or more instruction set architecture (ISA)-level instructions 170, which may provide a means for loading one or more configuration values 164 maintained within registers 132 in the control logic unit 125 and used to, for example, calculate the read and write addresses (e.g., 160, 165) of the binner unit 130 data streams. In some embodiments, the ISA instructions 170 may resemble sample instructions used to access texture, for graphics and/or compute programs. The ISA instructions 170 may be used to setup and access binning results 190. As with sample instructions, the ISA instructions 170 may enable the shader core 110 to directly access fixed function logic of the binner unit 130, thereby generalizing the use of this logic using the binner unit 130.

The ISA instructions 170 may be added to enable the shader core 110 access to the binner unit 130. The shader core 110 may be programmable, whereas the binner unit 130 may be a fixed function hardware unit. A fixed function hardware unit may refer to a hardware unit that, while configurable or modal, and thus responsive to a set of configuration registers, is not necessarily programmable. The shader core 110, on the other hand, may be a hardware unit that is fully programmable. Data links (e.g., 176, 172) may enable input from the shader core 110 and/or the storage subsystem 140 to be routed to the binner unit 130, in addition to a primitive stream input link (e.g., 186) that may be present in some architectures. An output path (e.g., 184, 194) from the binner unit 130 may enable the binner unit 130 to transfer binner output data 190 to the shader core 110. Another output path (e.g., 184, 168) from the binner unit 130 may enable the binner unit 130 to transfer the binner output data 190 to the storage subsystem 140. Yet another output path (e.g., 184, 198) from the binner unit 130 may enable the binner unit 130 to feed the binner output data 190 to downstream fixed function units such as the fine rasterizer 135. The control logic unit 125 may directly control the binner unit 130 by sending one or more control signals 182 via the link 178. The control logic unit 125 may oversee sequencing interactions between the shader core 110 and the binner unit 130.

The control logic unit 125 may select a function used by the binner unit 130 for assigning input to bins. The control logic unit 125 may also be responsible for handling any sequencing handshakes between the binner unit 130 and the shader core 110 to ensure that operations are complete before data is read, and that no graphics use of the binner unit 130 is corrupted by prematurely beginning a shader core 110-related use of the binner unit 130. In addition, the control logic unit 125 may ensure that no graphics use of the binner unit 130 can interfere with a shader core 110-related use of the binner unit 130. Details of these interlocks and safeguards may include micro-architecture aspects.

The shader core 110 may receive storage data 196 from the storage subsystem 140 via a path 197. The control logic unit 125 may control the selector 155. The selector 155 may be a multiplexor having two inputs 172 and 186. The input 172 may come directly from the storage subsystem 140. The input 186 may come directly from the CCV unit 120. In other words, the selector 155 may provide data from the storage subsystem 140 to the binner unit 130 via the link 172, and/or data from the CCV unit 120 to the binner unit 130 via the link 186. The selector 155 may select from among the inputs 172 and 186 based on a control signal received from the control logic unit 125 via control link 188. An output 192 of the selector 155 may be provided to the binner unit 130.

Furthermore, the binner unit 130 may be configurable. For example, a varying number of sorting input keys—not just a primitive's (x,y) coordinates—may be used. As part of the operation of the control logic unit 125 and the binner unit 130, various identification data may be maintained, such as thread identification (ID) or work group element, thereby enabling the output of the binner unit 130 to be properly tagged and/or identified, and correctly routed to a destination, be it a data store such as the storage subsystem 140, or directly to the shader core 110, etc.

A programming model may include providing a collection of macros that serve as building blocks for larger algorithms. The ISA instructions 170 may be made available to a compiler. ISA instructions may be used by one or more tuned shader cores (e.g., 110), which may provide for a merge sort, a radix sort, and/or other operations augmented by the binner unit 130, as further described below. The ISA instructions may be packaged and abstracted by a driver, such that an application can call the functionality, but does not necessarily gain access to the details of the implementation. One or more idiosyncrasies of the ISA instructions may be hidden, so that the ISA instructions may be present in early implementations, without necessarily being codified in specifications. Alternatively, more explicit instructions may be provided to an application. Thus, the programming model may be analogous to that of a generalized matrix multiplication (GEMMs) package, which may abstract away the lowest level details from an application.

Accordingly, the ISA instructions 170 may provide the shader core 110 with access to the binner unit 130. Additional data paths may enable input from the shader core 110 and the storage subsystem 140 to be routed to the binner unit 130. New output paths from the binner unit 130 may enable data to be returned to the shader core 110, and/or written to the storage subsystem 140. The control logic unit 125 may coordinate sequencing interactions between the shader core 110 and the binner unit 130.

In some embodiments, the shader core 110 may be configured to output data 142 via a path 146. The selector 155 may be configured to receive the data 142 via the first path 146 by way of the shader output unit 115 and the CCV 120. Alternatively, the selector 155 may be configured to receive the data 142 directly via path 147. In addition, the selector 155 may be configured to receive data 148 from the storage subsystem 140 via a path 172. The control logic unit 125 may be configured to control the selector 155, and to cause the selector 155 to transfer the data 142 and/or the data 148 to the binner unit 130. The shader core 110 may be configured to output one or more control signals 152 via the path 146. The selector 155 may be configured to receive the one or more control signals 152 via the path 146, and/or receive one or more control signals 154 from the storage subsystem 140 via the path 172. The control logic unit 125 may be configured to cause the selector 155 to transfer the one or more control signals 152 and/or the one or more control signals 154 to the binner unit 130. The binner subsystem 100 may include a path 194 from the binner unit 130 to the shader core 110. The binner unit 130 may be configured to transfer binner output data 190 to the shader core 110 via the path 194. The binner subsystem 100 may include a path 198 from the binner unit 130 to one or more subsequent stages (e.g., 135) of a graphics pipeline. The binner unit 130 may be configured to transfer the binner output data 190 to the one or more subsequent stages (e.g., 135) of the graphics pipeline via the path 198. The binner subsystem 100 may include a path 168 from the binner unit 130 to the storage subsystem 140. The binner unit 130 may be configured to transfer the binner output data 190 to the storage subsystem 140 via the path 168.

In some embodiments, the shader core 110 may be configured to control the control logic unit 125, and the control logic unit 125 may be configured to control the binner unit 130. The shader core 110 may be configured to communicate with the control logic unit 125 using one or more ISA instructions 170. The one or more ISA instructions 170 may provide a means for loading one or more configuration values 164 to one or more registers 132 of the control logic unit 125.

The control logic unit 125 may be configured to generate one or more read addresses 160 and/or one or more write addresses 165 based on the one or more configuration values 164 in the one or more registers 132 of the control logic unit 125. The control logic unit 125 may be configured to cause the binner unit 130 to read the data 148 from the storage subsystem 140 based on the one or more read addresses 160. The control logic unit 125 may be configured to cause the binner unit 130 to write data 190 to the storage subsystem 140 based on the one or more write addresses 165. The control logic unit 125 may include the address generation logic 128, and may be configured to control access to the storage subsystem 140 using the address generation logic 128. The control logic unit 125 may include the sequencing and arbitration logic 134 to control use of the binner unit 130 in coordination with the shader core 110 to reduce a number of calculations and to conserve energy.

Figure 2:
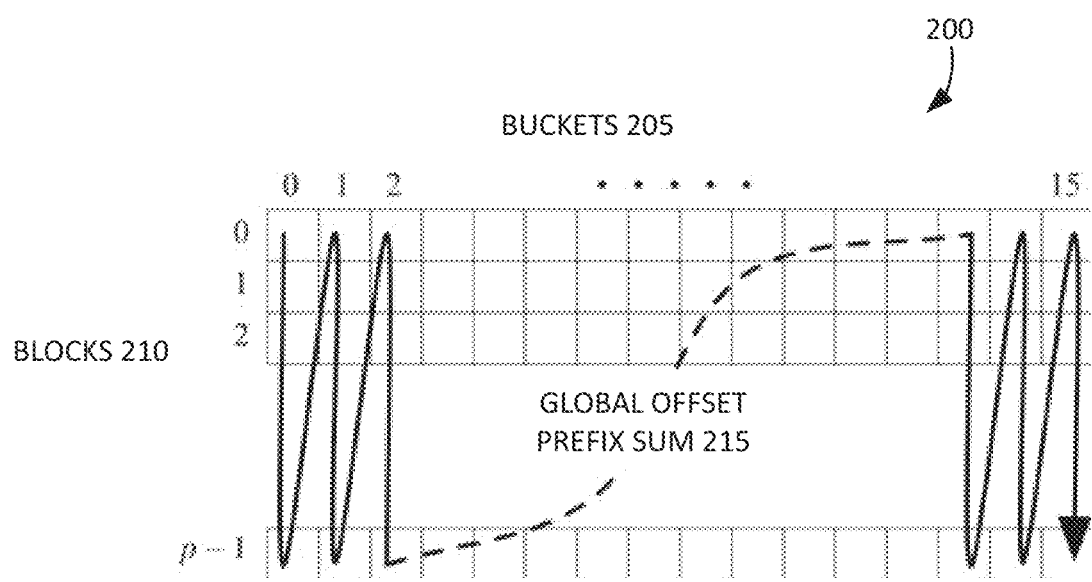
FIG. 2 is a graph diagram showing a pre-fix sum of data blocks in accordance with some embodiments.

FIG. 2 is a graph diagram 200 showing a pre-fix sum 215 of data blocks 210 relative to buckets 205 in accordance with some embodiments. Radix sort may include a non-comparison based sorting algorithm, which can be an efficient sorting method. One or more enhancements may be needed to implement the sequential radix sorting algorithm as an efficient and performant parallel GPU computing workload. The one or more enhancements may include 1) subdividing the input dataset into blocks to expose greater parallelism, and/or 2) pre-sorting the data blocks to maximize the locality of scatters associated with the radix sort algorithm. For example, a GPU radix sorting algorithm sorting 32-bit integers four-bits at a time may include one or more of the following steps, as illustrated in FIG. 3.

Figure 3:
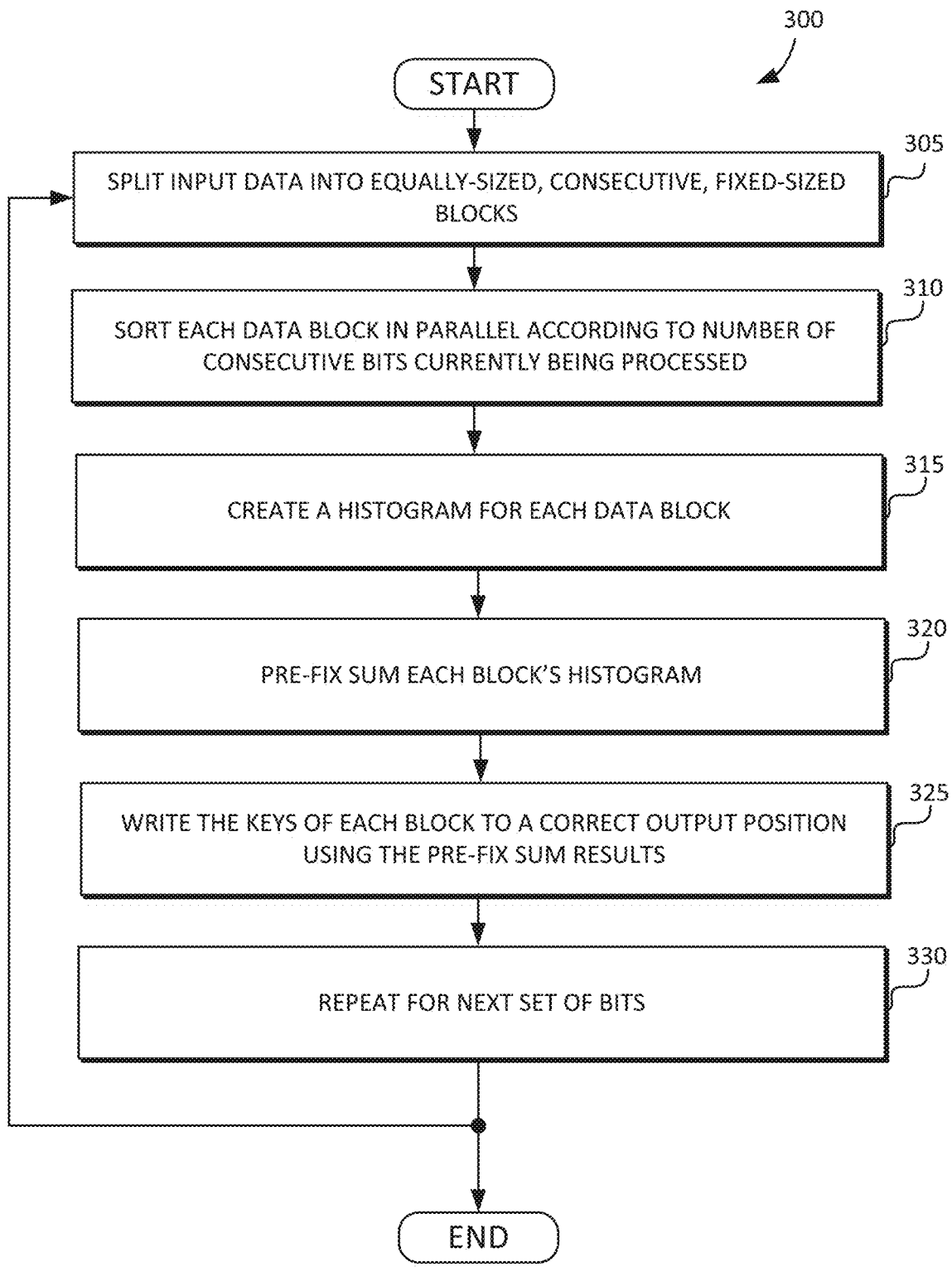
FIG. 3 is a flow diagram illustrating a technique for performing a GPU radix sort algorithm in accordance with some embodiments.

FIG. 3 is a flow diagram 300 illustrating a technique for performing a GPU radix sort algorithm in accordance with some embodiments. Reference is now made to FIGS. 1A, 2, and 3.

At 305, input data (e.g., keys) may be split into equally-sized, consecutive, fixed-size blocks 210. The size of a block can be set such that the block can fit in on-chip storage (e.g., caches, scratchpad memories, etc.). At 310, each data block may be sorted in parallel according to a number (e.g., four) of consecutive bits currently being processed (e.g., start with the least significant four-bits). Some or all keys with four-bit values equal to 0000 can come first, followed by keys with 0001, and so forth. Furthermore, some or all of the keys that have the same four-bit value can appear in the same order they were in originally. It will be understood that a different number of bits may be used, for example, two-bit values, five-bit values, six-bit values, eight-bit values, 16-bit values, or the like. The number of bits need not be a power of two. At 315, for each data block, a histogram may be created, which can count how many keys had each possible four-bit value (e.g., $2^4=16$ total possible buckets). The histogram creation at 315 can be performed in parallel with 310. At 320, each block's histogram may be pre-fix summed according to FIG. 2, for example. Using the pre-fix sum results 215 generated at 320, the keys of each block may be written to a correct output position at 325. At 330, steps 305 through 325 can be repeated for the next set of bits (e.g., set of four-bits), until all sets of bits have been processed. For 32-bit keys processed four-bits at a time, eight total iterations of steps 305 through 325 may be performed. The input to each successive iteration may be the output produced at 325 of the previous iteration.

Step 310 described above need not be functionally required. In other words, the sort can still work without step 310, but if the data is not sorted according to the four-bit keys currently being processed (i.e., if 310 were to be removed), the writes that occur at 325 may be much more scattered, thereby resulting in less efficient sorting performance. The pre-sorting performed at 310 can improve the locality of the scatters at 325, and may result in better overall performance. Hence step 310 may be used with the GPU radix sorting algorithms.

The binner unit 130 (of FIG. 1A) may be used to evaluate steps 310 and/or 315 in the above algorithm. Step 310 may sort the input keys according to a consecutive set of bits in each key. Hardware binners such as the binner unit 130 may take primitives as input and sort them according to the (x,y) screen space position of each primitive. In this example, the input may be primitives and the binning function may map the primitives to which tiles they appear in on the screen. Similarly, at 310, the input may include a block of keys (e.g., 32-bit unsigned integers), and the binning function may include the value of the four-bits currently being processed. The binner unit 130 may be made to be more flexible and/or configurable in terms of its input and/or output and binning function. For example, the binner unit 130 can be used to sort blocks of keys just as may be performed at 310. Furthermore, in some enhancements, the binner unit 130 can also keep track of how many inputs were mapped to each bin, which may be performed at 315.

Alternatively, the histogram created at 315 can be produced using software (i.e., not using the binner unit 130), but this may not be as efficient. One way for the software to produce the histogram is to have multiple shader core 110 threads processing a given block update, and ultimately produce one histogram for that block. This approach may include atomic memory increment operations since two or more threads may try to increment the same bin and/or bucket of the histogram simultaneously. Atomic operations may generally not be performant on existing GPUs due to dependencies associated with the atomic operations leading to serialization.

Another approach to producing the histogram, which avoids atomics, may be for each thread to produce its own local histogram, and then sum and/or combine and/or reduce these histograms into one final histogram. Although this approach avoids atomics, it may introduce additional instruction overhead to perform the reduction of the per-thread histograms, and may also use more memory to accommodate each thread's histogram. Furthermore, the reduction itself may rely on synchronization among the threads processing the block. Although this type of synchronization may be supported, it may result in a performance and/or efficiency penalty. Having the binner unit 130 (of FIG. 1A) perform the functions of steps 310 and 315 of the radix sort algorithm, and returning the data back to the shader core 110 (of FIG. 1A, e.g., via memory or on chip storage), may avoid several of the performance and/or efficiency issues associated with the software approach.

Figure 4:
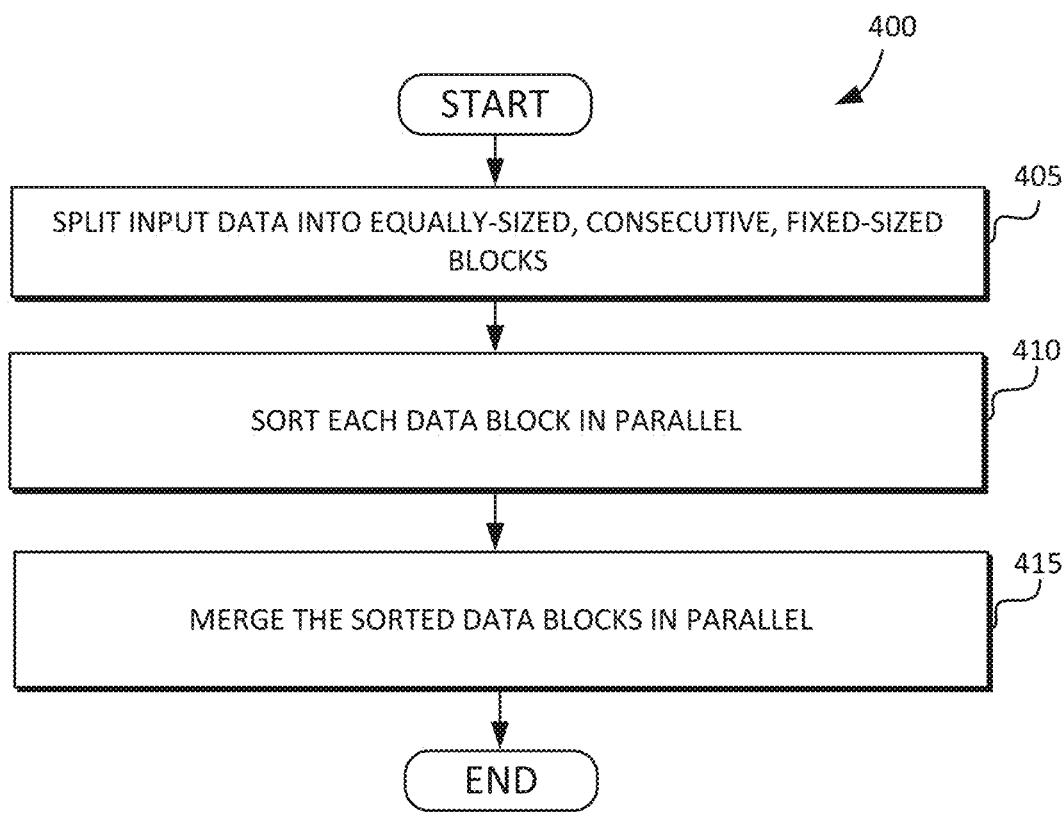
FIG. 4 is a flow diagram illustrating a technique for performing a GPU merge sort algorithm in accordance with some embodiments.

FIG. 4 is a flow diagram 400 illustrating a technique for performing a GPU merge sort algorithm in accordance with some embodiments. Reference is now made to FIGS. 1A and 4.

A merge sort may also be used as a sorting algorithm. A merge sort algorithm may proceed as follows:

At 405, input data (e.g., keys) may be split into equally-sized, consecutive, fixed-size blocks. The size of a block may be set such that the block can fit in on-chip storage (e.g., caches, scratchpad memories, storage subsystem 140 of FIG. 1A, etc.). This may be the same as the step 305 of the radix sort algorithm described above in FIG. 3. At 410, each data block may be sorted in parallel. Although similar to step 310 of the radix sort described above in FIG. 3, the step 410 may perform a full sort of the keys in the block, not just sorted according to a current set of consecutive digits in the keys. At 415, the sorted data blocks may be merged in parallel. The binner unit 130 can be used in step 410 of the merge sort algorithm. Through multiple uses of the binner unit 130, each time operating on a different consecutive set of bits in the keys, the data in each block can be fully sorted. The full sort at 410 may be accomplished by a radix sort, with each pass of the radix sort being done using the binner unit 130. For example, processing 32-bit keys four bits at a time may result in eight sequential uses of the binner unit 130, where the input to each successive use may be the output of the previous one. It will be understood that the 32-bit keys may be processed two bits at a time, five bits at a time, six bits at a time, eight bits at a time, and so forth. The number of bits processed at a time need not be a power of two.

Another embodiment may include high-quality transparency of many primitives, which may be performed using the binner unit 130 for depth sorting followed by rendering and blending—an advantage being that the sorting operation may be done as part of the pipeline, thereby avoiding expensive data movement or software-based central processing unit (CPU)-side sorting algorithms.

The sorting algorithms presented above may be some of the use cases of the binner unit 130 in GPU computing workloads. The binner unit 130 can be made to be more flexible and/or configurable, so that GPU computing algorithms can use the binner unit 130 to make algorithms faster and/or more efficient. For example, GPUs may become more energy and/or power efficient.

During compute workloads the binner unit 130 need not remain idle, and may be used for various algorithms. This can lead to both less wasted leakage, and also provide faster execution of certain algorithms that can benefit from the binner unit 130 functionality, e.g., certain sorting problems. When compared against software-based sorting algorithms, the binner-assisted algorithms can avoid the cost of atomic memory accesses, which may be energy-intensive, slow, and have long latency.

Figure 5:
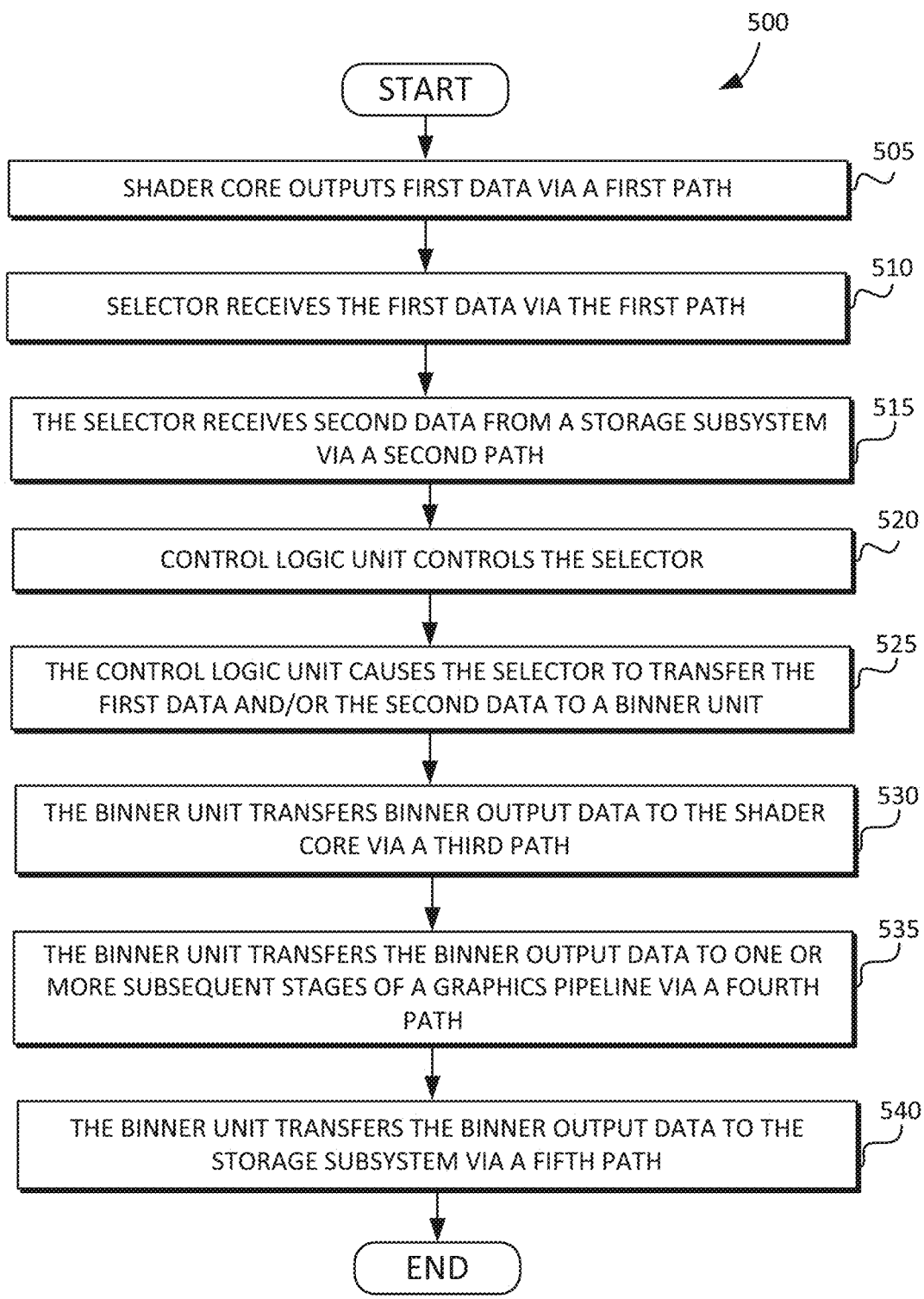
FIG. 5 is a flow diagram illustrating a binning technique of a GPU in accordance with some embodiments.

FIG. 5 is a flow diagram 500 illustrating a binning technique of a GPU in accordance with some embodiments. At 505, a shader core may output first data via a first path. At 510, the selector may receive the first data via the first path. At 515, the selector may receive second data from a storage subsystem via a second path. At 520, a control logic unit may control the selector. At 525, the control logic unit may cause the selector to transfer the first data and/or the second data to a binner unit. At 530, the binner unit may transfer binner output data to the shader core via a third path. At 535, the binner unit may transfer the binner output data to one or more subsequent stages of a graphics pipeline via a fourth path. At 540, the binner unit may transfer the binner output data to the storage subsystem via a fifth path.

It will be understood that the steps of FIGS. 3 through 5 need not be performed in the order shown, and intervening steps may be present.

The blocks or steps of a method or algorithm and functions described in connection with the embodiments disclosed herein may be embodied directly in hardware, in a software module executed by a processor, or in a combination of the two. Modules may include hardware, software, firmware, or any combination thereof. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, ASICs, embedded computers, cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A binning subsystem of a graphics processing unit (GPU), comprising:
   a storage subsystem;
   a shader core configured to output first data via a first path;

a selector configured to receive the first data via the first path, and second data from the storage subsystem via a second path;

a binner unit; and a control logic unit configured to control the selector, and to cause the selector to transfer at least one of the first data or the second data to the binner unit, wherein:

the shader core is configured to control the control logic unit, and the control logic unit is configured to control the binner unit;

the shader core is configured to communicate with the control logic unit using one or more instruction set architecture (ISA) instructions;

the one or more ISA instructions provide a means for loading one or more configuration values to one or more registers of the control logic unit; and the control logic unit is configured to generate at least one of a read address or a write address based on the one or more configuration values in the one or more registers of the control logic unit.

2. The binning subsystem of claim 1, wherein:

the shader core is configured to output a first control signal via the first path;

the selector is configured to receive the first control signal via the first path, and a second control signal from the storage subsystem via the second path; and the control logic unit is configured to cause the selector to transfer at least one of the first control signal or the second control signal to the binner unit.

3. The binning subsystem of claim 1, further comprising a third path directly from the binner unit to the shader core, wherein the binner unit is configured to transfer binner output data directly to the shader core via the third path.

4. The binning subsystem of claim 3, further comprising a fourth path from the binner unit to one or more subsequent stages of a graphics pipeline, wherein the binner unit is configured to transfer the binner output data to the one or more subsequent stages of the graphics pipeline via the fourth path.

5. The binning subsystem of claim 4, further comprising a fifth path from the binner unit to the storage subsystem, wherein the binner unit is configured to transfer the binner output data to the storage subsystem via the fifth path.

6. The binning subsystem of claim 1, wherein the control logic unit is configured to cause the binner unit to read the second data from the storage subsystem based on the read address.

7. The binning subsystem of claim 1, wherein the control logic unit is configured to cause the binner unit to write third data to the storage subsystem based on the write address.

8. The binning subsystem of claim 1, wherein the control logic unit includes address generation logic, and is configured to control access to the storage subsystem using the address generation logic.

9. The binning subsystem of claim 1, wherein the control logic unit includes sequencing and arbitration logic to control use of the binner unit in coordination with the shader core to reduce a number of calculations and to conserve energy.

10. A binning method of a graphics processing unit (GPU), comprising:

outputting, by a shader core, first data via a first path;

receiving, by a selector, the first data via the first path;

receiving, by the selector, second data from a storage subsystem via a second path;

controlling, by a control logic unit, the selector;

causing, by the control logic unit, the selector to transfer at least one of the first data or the second data to a binner unit;

communicating, by the shader core, with the control logic unit using one or more instruction set architecture (ISA) instructions, wherein the one or more ISA instructions provide a means for loading one or more configuration values to one or more registers of the control logic unit;

generating, by the control logic unit, at least one of a read address or a write address based on the one or more configuration values in the one or more registers of the control logic unit;

causing, by the control logic unit, the binner unit to read the second data from the storage subsystem based on the read address; and causing, by the control logic unit, the binner unit to write third data to the storage subsystem based on the write address.

11. The method of claim 10, further comprising transferring, by the binner unit, binner output data directly to the shader core via a third path directly from the binner unit to the shader core.

12. The method of claim 11, further comprising transferring, by the binner unit, the binner output data to one or more subsequent stages of a graphics pipeline via a fourth path from the binner unit to the one or more subsequent stages of the graphics pipeline.

13. The method of claim 12, further comprising transferring, by the binner unit, the binner output data to the storage subsystem via a fifth path from the binner unit to the storage subsystem.

14. The method of claim 10, further comprising controlling use of the binner unit, by the control logic unit, using sequencing and arbitration logic in coordination with the shader core to reduce a number of calculations and to conserve energy.

* * * * *